United States Patent [19]

Meins

[11] Patent Number: 4,636,666

[45] Date of Patent: Jan. 13, 1987

[54] HETEROPOLAR MAGNET

[75] Inventor: Juergen Meins, Baldham, Fed. Rep. of Germany

[73] Assignee: Thyssen Industrie AG, Fed. Rep. of Germany

[21] Appl. No.: 717,817

[22] Filed: Mar. 29, 1985

[30] Foreign Application Priority Data

Mar. 30, 1984 [DE] Fed. Rep. of Germany ....... 3411895

[51] Int. Cl.$^4$ ............................................. H02K 41/00
[52] U.S. Cl. ..................................... 310/13; 104/291; 104/294; 104/292; 318/135
[58] Field of Search ..................................... 310/12–14, 310/27; 104/290, 291, 292, 294; 318/135

[56] References Cited

U.S. PATENT DOCUMENTS 3,167,168  1/1965  Park .................................. 310/12 X
4,131,811 12/1978  Apsit et al. ...................... 310/12 X Primary Examiner—Donovan F. Duggan Attorney, Agent, or Firm—Hill, Van Santen, Steadman & Simpson

[57] ABSTRACT

An excitation arrangement for a long stator drive, particularly a synchronous long stator drive for rapid transit systems having combined generation of propelling and carrying forces comprises at least one heteropolar magnet which has a plurality of channels extending at right angles to the long stator direction and which are open at their pole plane lying opposite the long stator and in which magnetic coils assigned to the conductors are disposed. In order to improve the dynamic properties of the magnet, a subdivision of the magnetic coils generating the magnetic field is provided. Differing electrical behavior for slow and fast changes in the voltage driving the coil current is achieved by a tight coupling of one of the sub-coils to a short-circuit coil. Given slow changes in the drive voltage, a magnetic force resulting from the entire coil flux occurs. Given fast changes in the drive voltage, a dynamic reduction of the effective coil inductance leads to a fast current and magnetic force changes.

5 Claims, 7 Drawing Figures

HETEROPOLAR MAGNET

The present invention relates to a heteropolar magnet comprising a yoke and magnetic poles for generating the portative power for a magnetic levitation vehicle relative to a long stator comprising a plurality of grooves extending at right angles to the long stator direction and which are open at their pole plane lying opposite the long stator and in which the conductors of the magnetic coils are located.

In known magnetic poles, the conductors lying in a groove of the magnet embrace the two adjacent magnetic poles as a coil. The ferromagnetic circuit of the magnet is thereby constructed of sheet metal in order to oppose low resistance to a change in magnetic flux. The chronological current or, respectively, flux change and, therefore, the force change as well is thereby limited by the inductance of the magnetic coils and by the voltage driving the current, whereby the inductance is proportional to the square of the total number of turns located in the magnet groove. In magnetic levitation vehicles, the vehicle is held suspended by regulating the attractive power of the magnets. The limited actuating power in combination with the mass of the known magnets necessitates the utilization of large spacings between the magnets and the long stator relative to which the attractive force is effective. As a consequence, the magnets must be dimensioned large, involving the disadvantages of high capital expense, great mass of the magnets which additionally opposes the fine regulation of the position of the magnets because of the higher forces of inertia, and a high power consumption and corresponding installation for the magnets in the vehicle.

The object of the present invention, therefore, is to improve the dynamic properties of the magnet.

Given a magnet of the type generally set forth above, the above object is achieved, according to the invention, in a heteropolar magnet comprising a magnetic yoke and magnetic poles for generating the portative power for a magnetic levitation vehicle relative to a long stator and having a plurality of grooves extending at right angles relative to the long stator direction and which are open at their pole plane lying opposite the long stator and in which the conductors of the allocated magnetic coils are located, the structure being characterized in that the coils are subdivided into individual coils which are connected in series and wound in the same direction, in that at least one of the individual coils embraces the magnetic pole, and in that at least one of the other individual coils resides in a tight magnetic coupling to at least one further short-circuited coil. With the coil subdivided into individual coils connected in series and wound in the same direction, the individual coils support one another in generating the magnetic flux. Given a rapid change of the voltage level, the overall flux change in the ferromagnetic core in the region of the coils is greatly reduced given individual coils having a tight magnetic coupling to a short circuit coil, being therefore reduced by the inductively generated, oppositely directed magnetic flux. The effective inductance of the overall coil system is therefore essentially limited to the inductance of the sub-coils which surround the poles. The diminution of the inductance over that of the known magnetic coils enables a rapid change of the current and, therefore, of the attractive power. Nonetheless, the full magnetic flux generated by all coils is available for the stationary portion, namely that for the slow change of constant current charging. The dynamic behavior of the magnet is improved without a disadvantageous influence on the static behavior.

More specifically, a heteropolar magnet constructed in accordance with the present invention can be advantageously embodied as follows.

A tight coupling possibility for the coil to the short-circuit coil occurs in that one sub-coil disposed in the groove of the magnet is designed as a coil surrounding the magnetic yoke whereas two other sub-coils are designed as sub-coils surrounding the magnetic pole, further, only a slight coupling is present here due to the spatial distance from the coils surrounding the pole.

The short-circuit effect is promoted by the excitation of the yoke of solid iron, so that the short-circuit coils themselves can be dimensioned smaller and, therefore, more room is available for the coil winding of the sub-coils which generate the magnetic field.

Advantageously, the magnetic yoke is surrounded by a short-circuit coil designed as a closed copper jacket, the coil being wound thereon and the coil is surrounded by a further short-circuit coil designed as a closed copper jacket. Given a tight magnetic coupling to the coil, this design of the short-circuit coils saves space and is simple in structure.

By fabricating the reflux coil of band material extending parallel to the magnetic yoke, magnetic fields in the groove extend parallel to the individual bands, so that the generation of induction currents in the coil material, given changes in the field strength, is suppressed.

The sub-coil surrounding the magnetic poles are advantageously composed of band material extending parallel to the lateral faces of the magnet groove, whereby a spread of the magnetic field in the upper portion of the groove is opposed by the eddy current induced in the band material disposed at right angles to the propagation direction of the field.

ON THE DRAWINGS

Other features and advantages of the invention, its organization, construction and operation will be best understood from the following detailed description, taken in conjunction with the accompanying drawings, on which:

Figure 1:
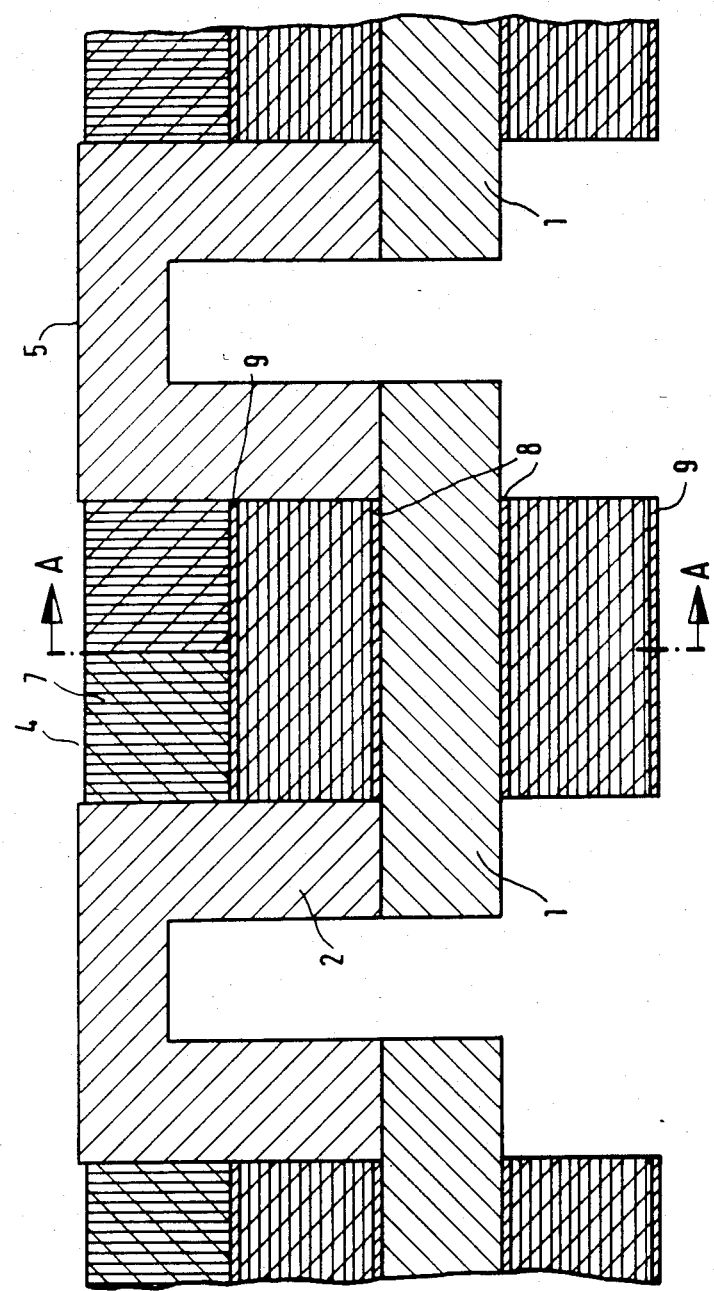
FIG. 1 is a fragmentary view illustrating the subdivision of a magnetic coil into individual coils embracing a magnetic yoke and individual coils embracing a magnetic pole.
Figure 2:
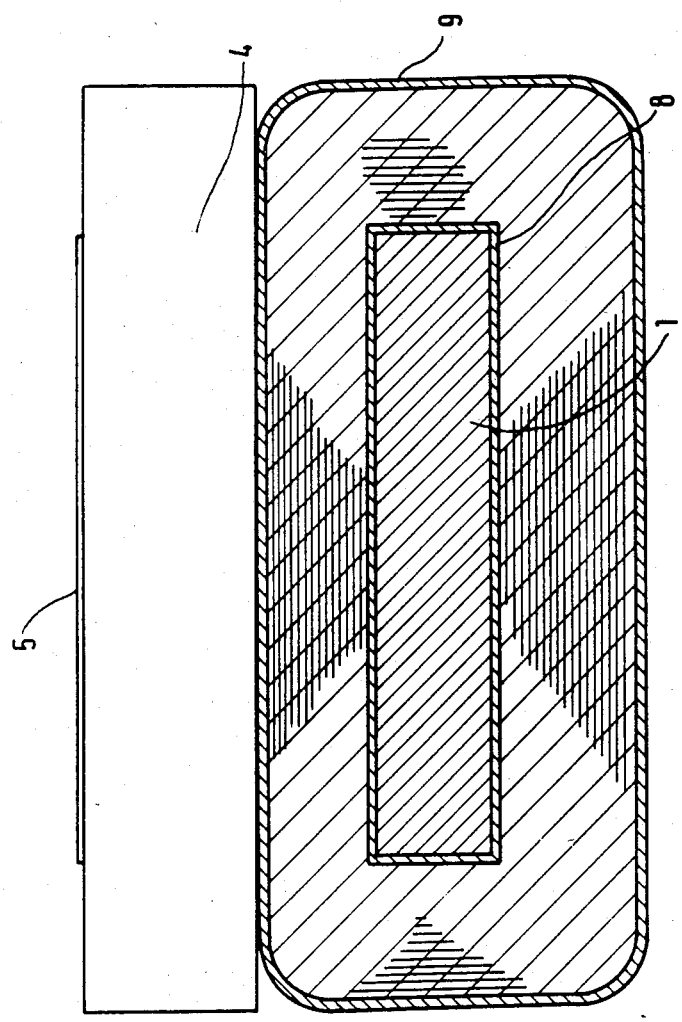
FIG. 2 is a sectional view taken along the parting line A—A of FIG. 1.
Figure 3:
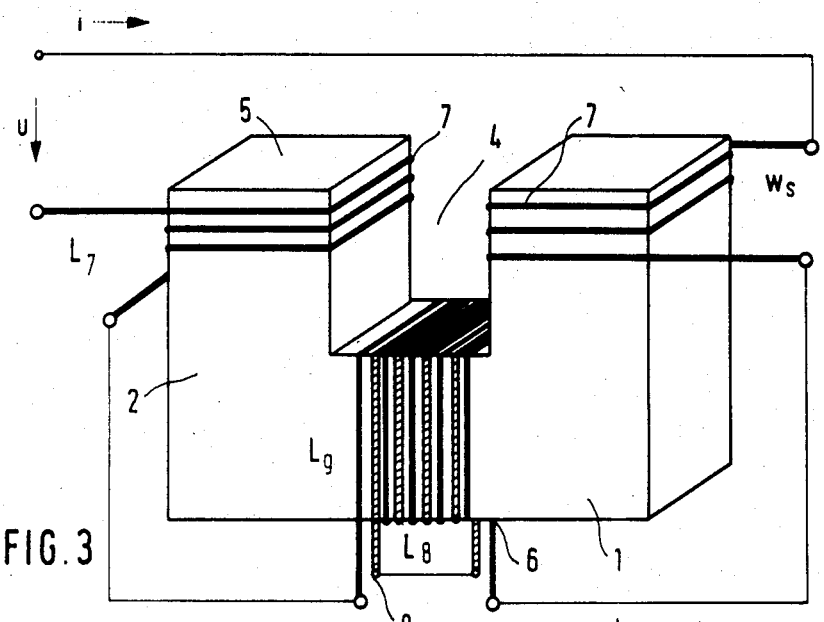
FIG. 3 is a perspective, simplified view of a portion of the magnet comprising two poles and an appertaining yoke and showing the basic disposition and circuit of the coils.
Figure 7:
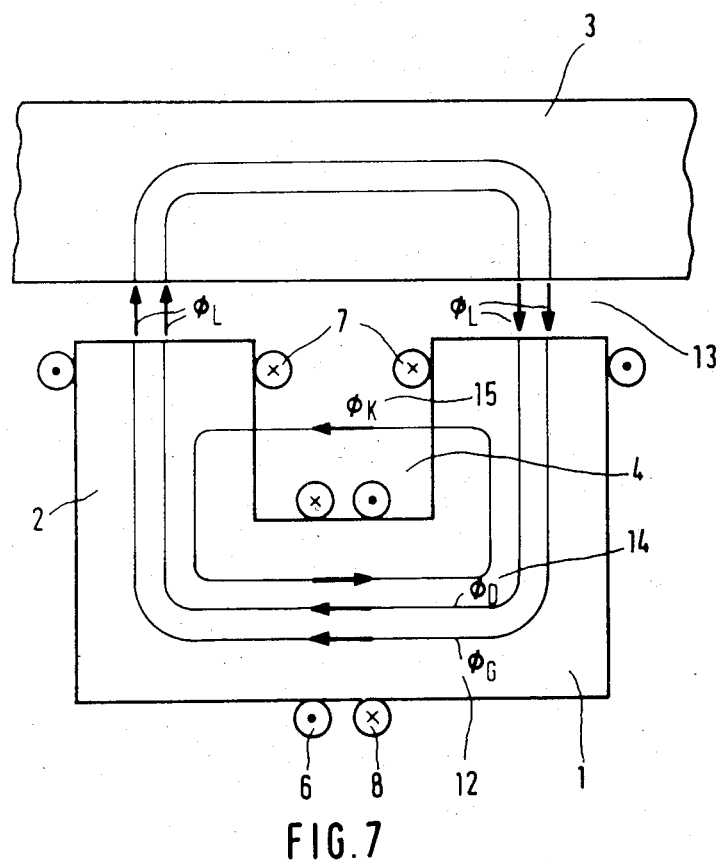
FIG. 7 is a magnetic circuit diagram illustrating the distribution of the magnetic flux in the submagnets of FIG. 3 and in a long stator.

Referring to the drawings, the heteropolar magnet comprising a magnetic yoke 1 and magnetic poles 2 serves for generating the portative power for a magnetic levitation vehicle relative to a long stator 3 (FIG. 7). The magnet has a plurality of grooves 4 (FIGS. 1 and 3) extending at right angles relative to the direction of the long stator 3 and which are open at their pole plane lying opposite the long stator 3 and in which the conductors of allocated magnetic coils are located. The magnetic coils are subdivided into individual coils 6, 7 which are connected in series (FIG. 3) and wound in the same direction. The two individual coils 7 embrace the magnetic poles 2. A coil 6 embraces the magnetic yoke 1 and has a tight magnetic coupling to short-circuit coils 8, 9 (FIGS. 1 and 3). The individual coils 7 embracing the magnetic poles 2 extend nearly up to the pole plane 5 as illustrated in FIGS. 1 and 2.

The magnetic yoke 1 is constructed from solid iron. This promotes the action of the short-circuit coils 8 and 9 by producing eddy currents. The short circuit coils 8 and 9 are closed copper jackets, whereby the short circuit coil 8 embraces the magnetic yoke 1 and the short circuit coil 9 embraces the coil 6 of the magnetic yoke 1. The coil 6 is fabricated of band material (sheet metal) extending parallel to the magnetic yoke 1, so that a change in stray magnetic flux caused by the individual coil 7 which proceeds in the direction of the coil 6 is opposed by only a slight resistance. The individual coils 7 embracing the magnetic poles 2 are composed of band material extending parallel to the lateral faces of the groove 4 and thereby oppose a high resistance to a change in the magnetic flux extending from the pole plane 5.

Figure 4:
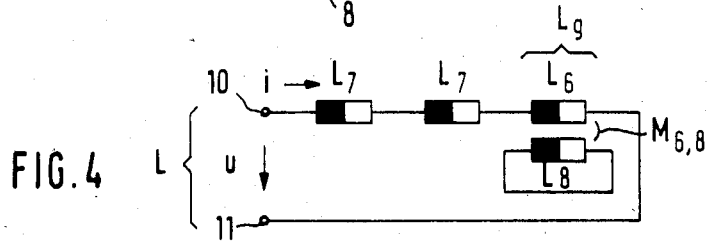
FIG. 4 is an equivalent circuit diagram of the coil arrangement of FIG. 3.
Figure 5:
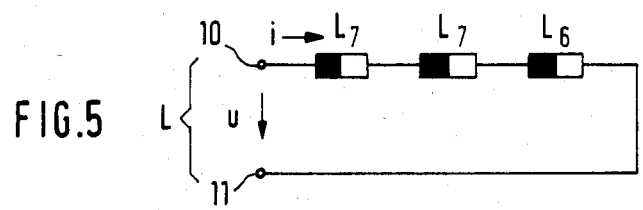
FIG. 5 is an equivalent circuit diagram with the inductions effective in the stationary case, with slow changes of voltage.
Figure 6:
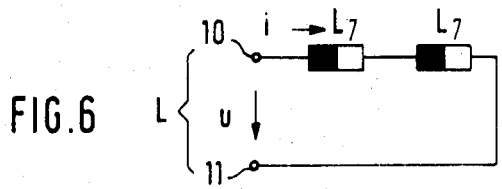
FIG. 6 is an equivalent circuit diagram with the self inductances acting given dynamic, fast, changes of voltage.

The physical operation given slow and rapid change of the voltage u shall be explained with reference to FIG. 3 and the appertaining equivalent circuit diagrams of FIGS. 4–6.

The inductances $L_6$–$L_8$ are the inductances of the individual coils which embrace the magnetic poles 2. The inductance $L_g$ occurs from the self-inductance $L_6$ of the magnetic coil 6, from the inductance $L_8$ of the short-circuit coil 8, and from the magnetic coupling $M_6$, $M_8$ between the coils 6 and 8. The overall inductance L effective at the terminals 10, 11 occurs from the series connection of the inductances $L_7$ and $L_g$.

When a DC current i flows in the arrangement, the magnetic fluxes of the individual coils 6 and 7 add and supply a corresponding air gap inductance in the air gap between the pole plane 5 and the long stator 3 (FIG. 7), this air gap inductance leading to the magnetic force. In this operating mode, the magnet does not differ in effect from the arrangements known in the art. The overall inductance L effective at the terminals 10, 11 in this case is the sum of the inductances $L_7$ and $L_6$ of the coil 6 in accordance with FIG. 5.

Given fast changes of the voltage u driving the magnet current i, the short-circuit coil 8 takes effect. An assumed discontinuous increase of the voltage u results in an increase of the current i. Due to this current increase in the coil 6, an increase of the magnetic flux in the yoke 1 occurs. The increase of the magnetic flux results in an induced current in the short-circuit coil 8 whose magnetic flux opposes the induced magnetic flux of the reflux coil 6, so that the chronological change of the resulting overall flux in the magnetic yoke 1 is significantly retarded. As a consequence of the slight chronological flux change, the voltage at the coil 6 likewise only changes slowly. Only a slight countervoltage is induced. The boost in the voltage u therefore takes complete effect at the individual coils 7 which embrace the magnetic poles 2 and leads to a rapid current rise in the coil system comprises of the series-connected coils 6 and 7. The equivalent circuit diagram of FIG. 6 for the rapid change of the voltage u shows that the coil 6 is not effective, but only the individual coils 7 embracing the magnetic poles. The overall induction effect at the terminals 10 and 11 is composed only of the inductances $L_7$ of the individual coils 7. A flux boost in the air gap between the pole planes 5 and the long stator 3 occurs due to the current boost. This result in a correspondingly rapid change of the magnetic force.

FIG. 7 illustrates this relationship with reference to a fundamental illustration of the magnetic fluxes occurring in the system. The magnetic flux $\phi_G 12$ occurs chronologically preceding the assumed boost in the coil voltage u. The course thereof through the overall magnet, the air gap 13 and the long stator 3 is indicated on the drawing. A magnetic force defined by the corresponding flux $\phi_G 12$ occurs in the air gap 13. After a rapid increase in the voltage u driving the current i, the corresponding increase in the coil current i and the additional, dynamic flux component $\phi_D 14$ occur. The counterflux $\phi_K 15$ generated by the short-circuit coil 8 extends through the groove 4, the magnetic poles 2 and opposes the flux increase $\phi_D 14$ of the coil 6 in the magnetic yoke 1. The consequence is that the current increase in the coil 6 does not result in an undesired countervoltage. Due to the closing of the magnetic flux $\phi_K 15$ of the short-circuit coil 8 in the groove 4, this flux does not attenuate the flux $\phi_L$ in the air gap 13, so that the flux $\phi_G 12$ before the voltage boost and the dynamic flux component $\phi_D 14$ can effect the rapid increase in the attractive power.

The embodiments of the invention in which an exclusive property or privilege is claimed are defined as follows:

1. An excitation arrangement for an elongate stator drive, which includes an elongate stator, having combined propelling and carrying forces, comprising: at least one heteropolar magnet including a plurality of channels therein extending at right angles to the direction to the elongate stator; electromagnetic coils disposed in said channels, said coils subdivided into individual coils connected in series and wound on said magnet such that the magnetic fields generated upon energization thereof add and support one another, said magnet comprising a magnet yoke and a pair of magnet poles at respective ends of said yoke, one of said individual coils wound on said yoke and two of said individual coils wound on respective ones of said magnet poles; and at least one short-circuit coil tightly coupled to at least one of said individual coils.

2. The excitation arrangement of claim 1, wherein: said yoke is constructed of solid iron and exhibits the effect of a short-circuit coil.

3. The excitation arrangement of claim 1, wherein: said at least one short-circuit coil comprises a pair of short-circuit coils each tightly wound on respective sides of said one coil wound on said yoke.

4. The excitation arrangement of claim 1, wherein: said one individual coil comprises a tape wound about said yoke and offers a slight resistance of magnetic flux produced by said two individual coils.

5. The excitation arrangement of claim 1, wherein: each of said two individual coils extend parallel to the lateral faces of the respective channels and a change of magnetic flux is therewith opposed by a high impedance.

* * * * *